US012655934B2

(12) United States Patent
Guo et al.

(10) Patent No.: US 12,655,934 B2
(45) Date of Patent: Jun. 16, 2026

(54) UNIVERSAL CEILING MOUNT

(71) Applicant: HEWLETT PACKARD ENTERPRISE DEVELOPMENT LP, Spring, TX (US)

(72) Inventors: Yuhai Guo, Beijing (CN); Yuying Chen, Beijing (CN); Aijun Liu, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 210 days.

(21) Appl. No.: 18/639,056

(22) Filed: Apr. 18, 2024

(65) Prior Publication Data

US 2025/0327546 A1     Oct. 23, 2025

(51) Int. Cl.
F16M 13/02     (2006.01)
(52) U.S. Cl.
CPC ................................ F16M 13/027 (2013.01)
(58) Field of Classification Search
CPC .... F16M 13/027; F16M 11/041; E04B 9/006; F16B 2/12
See application file for complete search history.

(56) References Cited

U.S. PATENT DOCUMENTS

| | | | | | |
|---|---|---|---|---|---|
| 3,511,463 | A * | 5/1970 | Thomas | ................... | E04B 9/006 |
| | | | | | 52/39 |
| 7,264,211 | B2 * | 9/2007 | Lindner | ................... | E04B 9/006 |
| | | | | | 248/220.21 |
| 10,161,565 | B2 * | 12/2018 | Wu | ........................... | F16F 1/12 |
| 10,403,183 | B2 | 9/2019 | Pyc et al. | | |

| | | | | | |
|---|---|---|---|---|---|
| 10,514,127 | B2 * | 12/2019 | Wu | ......................... | E04B 9/006 |
| 10,533,703 | B1 * | 1/2020 | Nguyen | ............... | F16M 13/027 |
| 10,774,985 | B1 * | 9/2020 | Ortel | .................... | F16M 11/041 |
| 10,788,176 | B2 * | 9/2020 | Medendorp, Jr. | ....... | F21V 21/02 |
| 10,871,259 | B2 * | 12/2020 | Nguyen | ............... | F16M 11/041 |
| 11,486,539 | B2 | 11/2022 | Wu et al. | | |
| 12,426,174 | B2 * | 9/2025 | Ramones | ................. | H02G 3/20 |
| 12,435,510 | B2 * | 10/2025 | Guo | ......................... | E04B 9/006 |
| 12,442,489 | B2 * | 10/2025 | Liu | ...................... | F16M 11/043 |
| 2014/0117186 | A1 * | 5/2014 | Govindasamy | ........ | F16M 11/16 |
| | | | | | 248/317 |
| 2023/0126195 | A1 | 4/2023 | Zlotnikov et al. | | |

OTHER PUBLICATIONS

Extreme Networks, "Mount the Access Point Using the WS-MBI-DCFLUSH Bracket to a Flat T-bar," ExtremeWireless AP510i Access Point Installation Guide, Mar. 2021, 49 pages.

* cited by examiner

*Primary Examiner* — Bradley Duckworth
(74) *Attorney, Agent, or Firm* — Jones Robb, PLLC

(57)     ABSTRACT

A ceiling mount comprises a mounting plate assembly that is configured to be coupled to the electronic device. The ceiling mount further includes two clips configured to engage with opposite sides of a ceiling rail to mount the ceiling mount to the ceiling rail, and two linkages configured to be extendible and collapsible. Further, each of the clips includes an engagement member configured to engage the ceiling rail, and a supporting arm coupled to the engagement member. The mounting plate assembly is positioned between the clips and the linkages. Moreover, each of the two linkages is connected to each of the two clips so that moving the two clips relative to the mounting plate assembly moves, in turn, the two linkages relative to the mounting plate assembly. The movement of the two linkages relative to the mounting plate assembly maintains the two clips parallel to each other.

20 Claims, 8 Drawing Sheets

UNIVERSAL CEILING MOUNT

INTRODUCTION

Electronic devices, such as wireless Access Points (APs), are sometimes mounted to the ceiling of a building. In particular, the electronic devices may be mounted to ceiling rails, such as the ceiling rails that make up a dropped ceiling (a dropped ceiling comprises ceiling tiles supported by a grid of rails hung below a main structural ceiling). Mounting wireless APs and other electronic devices to ceiling rails is particularly common, for example, in large scale network deployments, such as those found at a college campus or office building. The electronic devices may be mounted to a ceiling rail via a device called a ceiling mount, which has one side that is mounted to the rail and an opposite side coupled to the electronic device. The ceiling mount may be a separate device that is removably coupled to the electronic device, or the ceiling mount may be a part of (e.g., permanently coupled to) the electronic device.

BRIEF DESCRIPTION OF THE DRAWINGS

The present disclosure can be understood from the following detailed description, either alone or together with the accompanying drawings. The drawings and related description of the figures are included to provide a further understanding of the present disclosure and are incorporated in and constitute a part of this specification. The drawings illustrate one or more nonlimiting aspects and implementations of the present teachings and together with the description explain certain principles and operation. In the drawings:

FIG. 1 is a block diagram illustrating a ceiling mount.

FIG. 4A illustrates the linkage in a first state. FIG. 4B illustrates the linkage in a second state.

FIGS. 5A and 5B are perspective views of a portion of the ceiling mount of FIG. 3 comprising an assembly of two linkages and two clips attached to each other. FIG. 4A illustrates the assembly in a first state. FIG. 4B illustrates the assembly in a second state and with one of the clips omitted from the view to avoid obscuring other aspects.

FIG. 7A illustrates the ceiling mount in a first state with the clips thereof in first positions and the links thereof in a first state. FIG. 7B illustrates the ceiling mount in a second state with the clips thereof in second positions and the links thereof in a second state.

FIG. 8 is a perspective view of the ceiling mount of FIG. 3 mounted to the ceiling rail.

DETAILED DESCRIPTION

Figure 2:
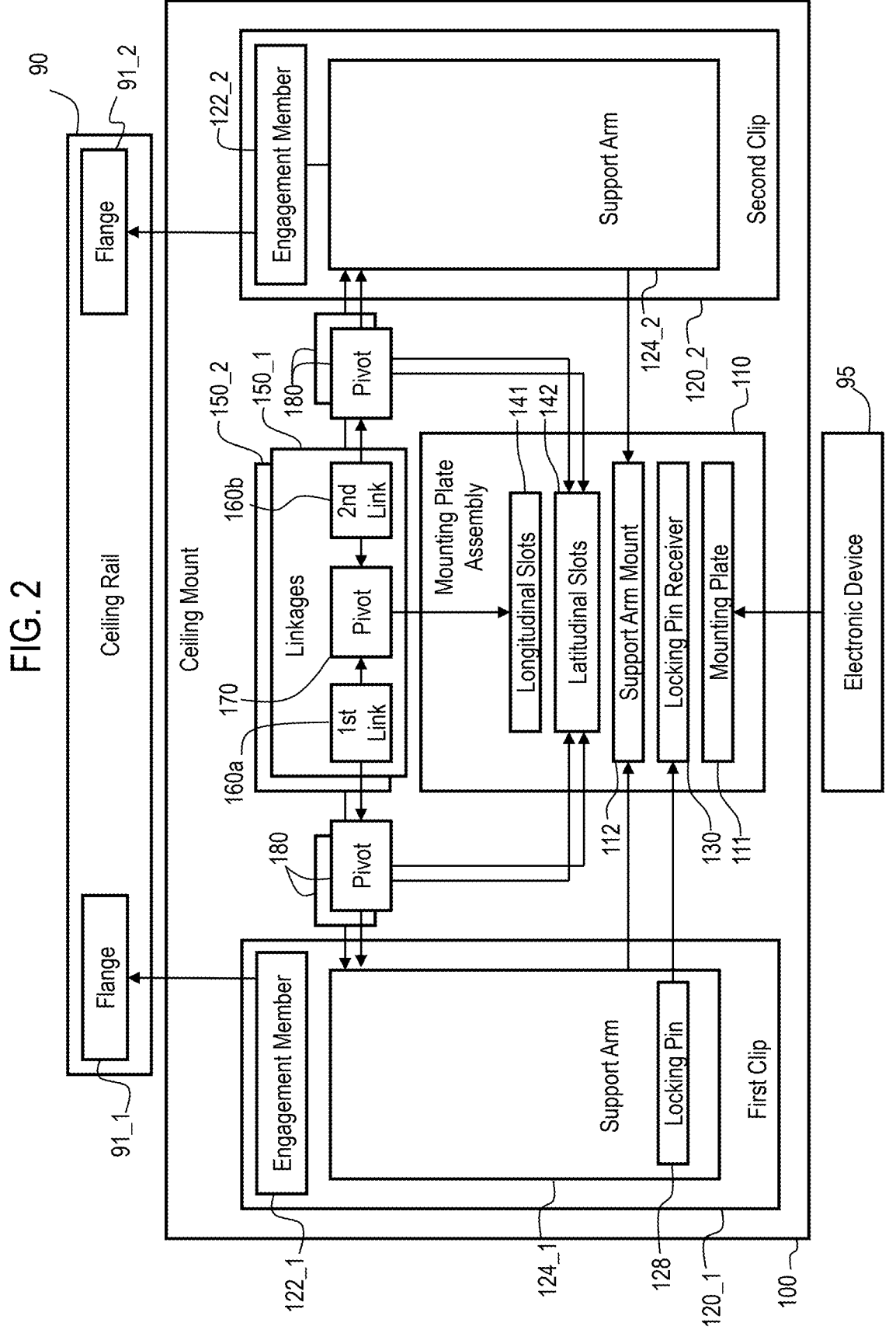
FIG. 2 is a block diagram illustrating a system comprising the ceiling mount of FIG. 1 and an electronic device.

Ceiling rails come in a variety of sizes and shapes. In particular, some ceiling rails comprise a pair of horizontal flanges (e.g., at the bottom of the rail), and a ceiling mount for an electronic device may be mounted to the rail by engaging with these flanges. However, different types of ceiling rails have a variety of different widths. Because of this variation in width, different types of ceiling mounts may be needed for different types of ceiling rails. Thus, a manufacturer of electronic devices may need to produce multiple different ceiling mounts to enable their electronic devices to be mounted to any of the various types of ceiling rails commonly in use. This can result in increased costs, as more time may need to be spent designing all the different ceiling mounts and multiple sets of tooling may be needed to produce the different ceiling mounts. In addition, the different types of ceiling mounts may need to have different stock-keeping units (SKUs), which can increase logistical complexity and further drive-up costs. Moreover, selecting one of these multiple ceiling mounts can be confusing for the customer, as the customer may not know which type of ceiling rail they have and/or which one of the many ceiling mount options they need. Alternatively, if a manufacturer desires to automatically provide ceiling mounts along with each electronic device that is sold so that the user does not need to select a ceiling mount, the manufacturer may need to provide many ceiling mounts with each electronic device in order to ensure compatibility with all of the commonly used types of rails, which further drives up costs and creates waste in the form of the provided ceiling mounts that the user does not use.

In addition, some ceiling mounts can be somewhat difficult to install or uninstall. In particular, many ceiling mounts comprise mounting mechanisms that need to be actuated during mounting or unmounting by fine manual motions, such as loosening/tightening a screw (whether using a tool or by hand), while the ceiling mount is positioned at the ceiling rail. While the actuation of such mounting mechanisms may be relatively easy in some contexts, when performed in the context of installing a ceiling mount on a ceiling rail, these actions can be relatively difficult. During installation, a person installing the ceiling mount (referred to herein as a user for simplicity) usually stands on a ladder and reaches above their head, and in this state the user may only have one free hand to use for actuating the attachment mechanism, as the other hand may be occupied (e.g., holding the electronic device to be mounted, holding tools, holding onto the ladder, etc.). Also, when the ceiling mount is positioned adjacent the ceiling rail for mounting or unmounting, the mounting mechanisms of the ceiling mount might not be accessible from a convenient direction or visible to the user, for example because the electronic device coupled to the ceiling mount might block the most direct approach to accessing or seeing the mounting mechanism. Thus, the otherwise simple tasks associated with actuating an attachment mechanism can be much more difficult to perform in the context of mounting/unmounting the ceiling mount to the ceiling rail.

To address these and other issues, examples disclosed herein comprise ceiling mounts that can be relatively easily mounted to (and unmounted from) a variety of different ceiling rails having different widths. In other words, the ceiling rails are adaptable for compatibility with a variety of ceiling rail widths. In some examples, a ceiling mount comprises a pair of clips that engage with the flanges of the ceiling rail, and the clips are movable towards or away from one another in coordinated motion so as to change a separation distance between the clips (more specifically, a separation distance between engagement members of the clips is changed, where the engagement members are the portions of the clips that engage with the ceiling rail). The separation distance of the clips can be varied through a range of distances, which includes the respective widths of many different types of ceiling rails. This allows the clips to be adapted for mounting to multiple different types of ceiling rails having different widths. Thus, a single ceiling mount can replace multiple different ceiling mounts, thereby reducing the costs, complexity, and other difficulties noted above associated with needing to have multiple different ceiling mounts.

In addition, the motion of the clips may be coordinated by a set of linkages which are coupled to each of the clips and by the mounting plate which constrains the motion of the linkages, thereby also constraining the motion of the clips coupled to the linkages. This coordination of the linkages, among other things, may allow example ceiling mounts disclosed herein to be relatively easy to install. In some examples, the ceiling mount includes an attachment mechanism which comprises a locking pin attached to one of the clips and a pin receiver attached to a mounting plate. The pin receiver has a series of holes in predetermined positions, and the locking pin is inserted into one of the holes to lock the clips into a predetermined positional arrangement associated with the hole. In some examples, the locking pin is spring loaded toward the holes, and thus prior to moving the clips the user may first move the locking pin to a disengaged position by pulling on a handle attached to the locking pin. The user can then move the clips by manually applying forces to move engagement members of the clips towards one another (e.g., squeezing/pressing the engagement members together) until they engage with the ceiling rail, whereupon the user can release the locking pin and allow the spring to automatically force the locking pin into one of the holes. In this manner, the attachment mechanism locks the clips into this engaged position on the ceiling rail. These actions of pulling the handle of the locking pin, moving the engagement members together, and releasing the handle of the locking pin can be performed relatively easily. In particular, the engagement members are relatively large (as compared to screws or other common attachment mechanisms) and moving them does not require high manual dexterity, high precision, or fine motor control from the user (such as may be required for turning screws, for example). In addition, the coordination of the movement of the clips allows them to move relatively smoothly and easily. Thus, the engagement members can be relatively easily moved together even while using just one hand, while standing on a ladder, while reaching above one's head, and/or without having direct vision of the engagement member. Similarly, the handle of the locking pin is relatively large and pulling it does not require precise movements, manual dexterity, or fine motor control, and in some cases can be performed by touch without requiring vision of the locking pin. Thus, it can be much easier to mount the ceiling mounts disclosed herein to the ceiling rail than it can be to mount other types of ceiling mounts.

As noted above, in some examples, the clips can be moved in a coordinated fashion to change the separation distance between their engagement members to accommodate different rail widths, and also the engagement members can be locked into place when engaged with the ceiling rail. These functions are facilitated, in part, by a pair of linkages that connect the clips to each other and by a mounting plate which constrains the motion of the linkages. These linkages control the motion of the clips and also transfer forces applied by a user to one clip to the other clip. In particular, the linkages are coupled to the clips and to the mounting plate such that moving the clips together collapses the linkages while moving the clips apart expands the linkages. Moreover, if a force is applied to one of the clips urging it to move in one direction, the linkages convert that into a force urging other clip to move in the opposite direction. Thus, if a user pushes one clip towards the centerline of the ceiling mounting, the linkages will convert that into a force which urges the other clip to also move towards the centerline. Conversely, if a user pulls one clip away from the centerline, the linkages will convert that into a force which urges the other clip to also move away from the centerline. In this manner, the linkages and mounting plate together cause both clips to be moved together in a coordinated fashion, either both moving towards one another simultaneously or both moving away from one another simultaneously, even if a user only applies forces directly to one of the clips. This ability to move both clips by applying forces to just one clip may be advantageous in circumstances in which it might be difficult for a user to simultaneously apply forces to both clips, such as when a user has only one free hand for manipulating the clips. This mechanical linkage between the clips also allows a single locking pin attached to a single clip to secure both clips simultaneously, avoiding the need for a user to actuate two locking pins (one for each clip). In addition, the coordinated motion of the clips as controlled by the linkages also ensures that the clips will always remain substantially parallel to one another as they are moved. This can help prevent binding of the clips and ensure smooth motion thereof. Furthermore, the coordinated motion of the clips as controlled by the linkages also ensures that the clips are always equal distances from a centerline of the ceiling mount as one another. This can ensure that, as the clips are moved together onto a ceiling rail, the ceiling mount is automatically centered on the ceiling rail without the user needing to pay attention or take special steps to achieve this centering.

Each linkage includes two links connected to each other via a shared pivot that allows the two links to rotate relative to each other around a rotational axis in a motion that resembles the hands of a clock. Each link has a pivot end which is connected to the shared pivot and a tip end which is opposite from the pivot end. The tip end of each link is pivotably coupled to one of the clips by another pivot, such that the link can rotate relative to the clip. This pivot which connects a tip end of a link to a clip may be referred to herein as a tip-end pivot to distinguish it from the shared pivot which connects two links together. Each of the collapsible linkages has the tip end of one of its links connected to one of the two clips and the tip end of its other link connected to the other clip, while at the same time the two links are connected to each other via their overlapping pivot ends.

The rotation of the links relative to each other around the shared central pivot allows the relative positions of the tip ends of each link to change, which changes the shape or state of the linkage. Specifically, the linkage can change from an extended state, in which the tip ends of each link are at the farthest relative distance from each other to a collapsed state, in which the tips ends of the links are closer together (in some cases, adjacent or overlapping one another). Because the linkages are coupled to the clips, the changing of a linkage between the expanded and collapsed states causes the clips to move relative to one another, and vice versa. For example, applying a force (squeezing/pressing, etc.) which urges the two clips to move together results in the linkages moving towards the collapsed state, whereas pulling the clips apart results in the linkage moving toward the expanded state. Similarly, if the linkages are moved towards the collapsed state, this causes the two clips to move together, whereas if the linkages are moved toward the expanded state, this causes the clips to move apart.

In addition to being coupled to the clips, the linkages are also movably coupled to the mounting plate. Specifically, the shared central pivot and the two tip-end pivots of each linkage are movably coupled to (e.g., extend through) corresponding slots in the mounting plate. The slots constrain the motion of the pivots to only translation along the elongation directions of the slots, and thus the motions and positions of the links and clips are also constrained such that only certain motions and positions thereof are permitted. In particular, the pair of linkages collapses and extends in synchronization with each other to retain a mutually parallel position of the clips as the clips move towards or away from each other. In addition, the slots constrain the linkages such that the clips are always substantially the same distance from the centerline of the ceiling mount as one another. This self-centering effect is achieved by guiding vertices of the pair of linkages along aligned slots, to connect the clips at different but aligned positions. As a result, once the linkages are fully extended, the linkages are perpendicular to the clips. And once the linkages are fully collapsed, the vertices of the pair of linkages traveled toward each other along the same straight line. Furthermore, the movement of one clip is converted by the linkages into a complementary movement of the other clip, regardless of which clip the user applies force to, as described above. This synchronized motion of the clips occurs because the slots constrain the motion of the pivots such that the two tip-end pivots of each linkage are always forced to move in opposite directions by the same amount. In particular, if one tip-end pivot of a linkage moves along its slot, this causes the shared pivot to also move along its slot, which in turn causes the other tip-end pivot to also moves along its slot in an opposite direction to the first tip-end pivot.

Moreover, once the locking pin is in place, the ceiling mount is secured on the ceiling rail as a consequence of the engagement members being engaged with the ceiling rail, without the user needing to perform any additional actions to secure the ceiling mount to the rail. In some examples, the ceiling mount does not need to be adjacent to the ceiling rail during the actions of spreading the clips apart to their initial separation distance and/or actuating the pair of linkages between the first and second states. Accordingly, the user can perform these actions in a convenient context (e.g., while on the ground, without their arms extended above their head, while having two hands available, and/or prior to attaching the electronic device to the ceiling mount). The ability to perform these actions away from the ceiling rail can make these actions very simple to perform. In some examples, the only action that needs to be performed while the ceiling mount is adjacent to the ceiling rail are the actions of squeezing the clips together and locking them with a pin, which can be a relatively easy action to perform as already described above. Thus, the overall process of installing the ceiling mount can be relatively simple.

Similarly, the process of uninstalling the ceiling mount can be relatively simple. To release the ceiling mount from the ceiling rail, the locking pin is removed, and the clips become free to move toward or apart from each other. Turning now to the figures, various devices, systems, and methods in accordance with nonlimiting aspects of the present disclosure will be described.

Figure 1:
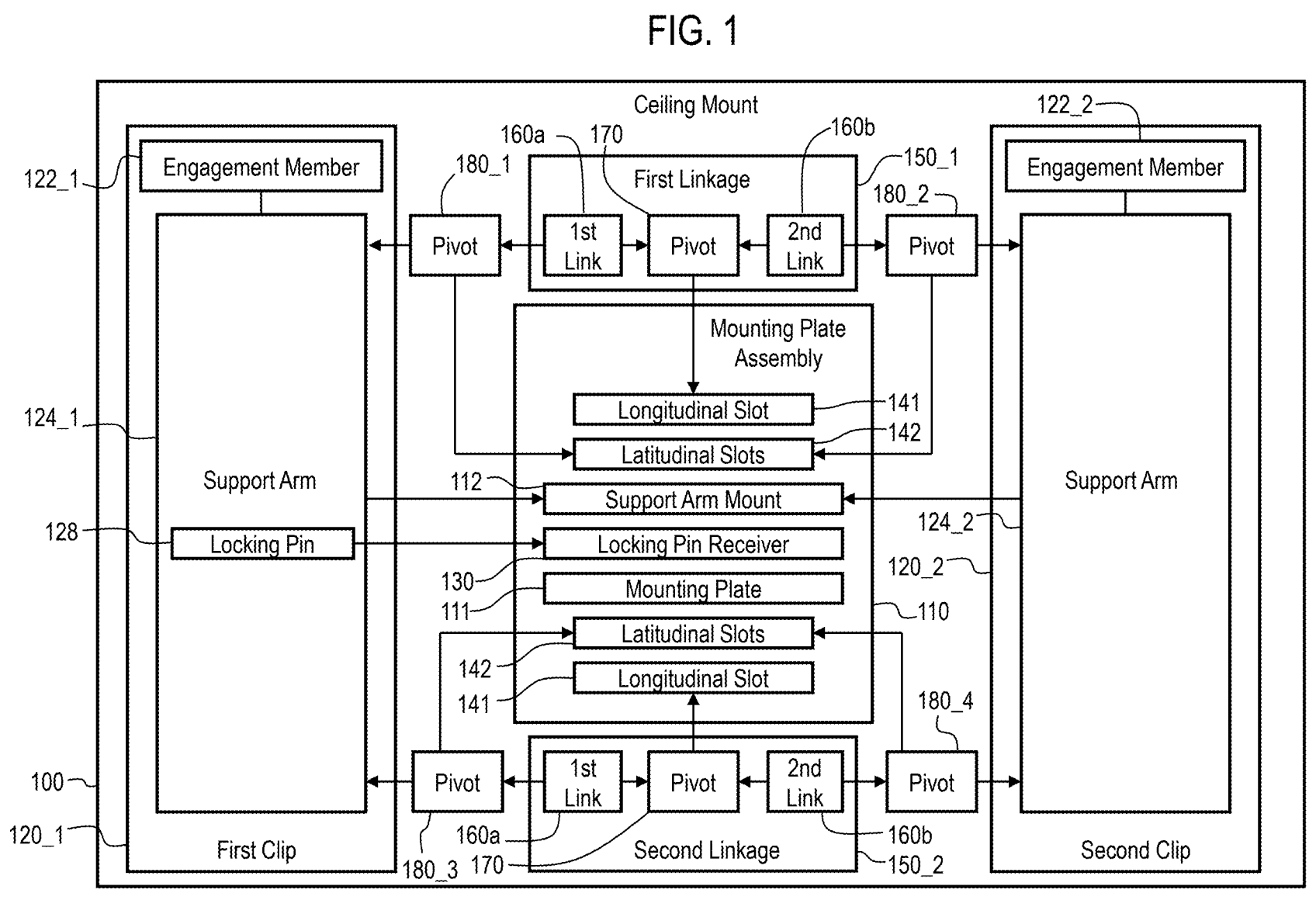

FIG. 1 is a block diagram conceptually illustrating a ceiling mount 100 for mounting an electronic device to a ceiling rail. FIG. 2 is a block diagram conceptually illustrating a system 1000 comprising the ceiling mount 100 of FIG. 1. The system 1000 is one example of a system in which the ceiling mount 100 may be utilized, but the ceiling mount 100 can be provided separately from the other components of the system 1000 and can be used in other systems. It should be understood that FIGS. 1 and 2 are not intended to illustrate specific shapes, dimensions, or other structural details accurately or to scale, and that implementations of the ceiling mount 100 and system 1000 may have different numbers and arrangements of the illustrated components and may also include other parts that are not illustrated.

As shown in FIGS. 1 and 2, the ceiling mount 100 comprises a mounting plate assembly 110, two linkages 150, and two clips 120 coupled to the mounting plate assembly 110, specifically a first clip 120_1 and a second clip 120_2. The mounting plate assembly 110 comprises a mounting plate 111, support arm mount 112, locking pin receiver 130, and multiple sliding slots. The sliding slots include longitudinal slots 141 and latitudinal slots 142. Each of the clips 120 comprises an engagement member 122 and one or more support arms 124. Specifically, first clip 120_1 comprises engagement member 122_1 and support arm 124_1, while second clip 120_2 comprises engagement member 122_2 and support arm 124_2. One of the support arms 124 of one of the clips 120 has a locking pin 128 attached thereto. Further, each of the linkages 150 includes a set of two links, namely link 160a and link 160b, and a shared central pivot 170 which pivotably connects the links 160a and 160b together. These components are described in greater detail below.

The mounting plate assembly 110 structurally supports the other components of the ceiling mount 100, such as the two linkages 150 and the clips 120. The mounting plate assembly 110 is coupled to the clips 120 via the support arm mount 112, as will be described in greater detail below. In addition, the mounting plate 111 is configured to be coupled to an electronic device 95, and when so coupled the mounting plate assembly 110 acts as an intermediary that links the clips 120 to the electronic device 95. For example, in the system 1000 of FIG. 2, an electronic device 95 is coupled to the mounting plate 111, as indicated by the arrow connecting the two. In some examples, the mounting plate 111 is distinct from and removably couplable to the electronic device 95, for example via removable fasteners (e.g., screws), snap fittings, or any other removable attachment technique. In other examples, the mounting plate 111 may be permanently coupled to the electronic device 95. For example, in some implementations the mounting plate 111 may be an integral part of or may be permanently attached to a chassis of the electronic device 95, for example by welding, friction or press fitting, permanent fasteners (e.g., rivets) or any other permanent attachment technique.

As noted above, the clips 120 are coupled to the mounting plate assembly 110. Specifically, each of the clips 120 comprises one or more support arms 124 that are coupled to the mounting plate assembly 110 by engaging with corresponding support arm mount 112 coupled to the mounting plate 111, as indicated by arrows in FIGS. 1 and 2. The support arm mount 112 provides an interface for each support arm 124, as well as for the linkages 150. For example, the mounting plate assembly 110 is placed between the clips 120 and the linkages 150. Specifically, in some examples the support arm mount 112 is positioned between the clips 120 and the linkages 150, with the clips 120 and linkages 150 being coupled together by pivots 180 which extend through the support arm mount 112 (via the latitudinal slots 142, as will be explained in greater detail below).

Thus, for example, in some implementations the support arms 124_1 and 124_2 lay over and engage with the mount 112 so that the arms 124_1 and 124_2 can slide over the mount 112, with the mount 112 constraining motion of the support arms 124. At the same time, the arms 124_1 and 124_2 are connected to the linkages 150_1 and 150_2, which further constrain motion of the arms 124. In other words, both linkages 150_1 and 150_2 are connected to both arms 124_1 and 124_2, with the mounting plate assembly 110 being placed between the linkages 150_1 and 150_2 and the arms 124_1 and 124_2. In particular, for each of the linkages 150, a tip end of the first link 160_a_ is pivotably connected to one support arm 124 via a pivot 180 and a tip end of the second link 160_b_ is pivotably connected to the other support arm 124 via another pivot 180, with the pivots 180 extending through the mounting plate assembly via the latitudinal slots 142. The pivots 180 may comprise a pin, rivet, or other fastener which can provide a pivotable connection. More specifically, a tip end of the first link 160_a_ of first linkage 150_1 is pivotably connected to the support arm 124_1 via a pivot 180_1; a tip end of the second link 160_b_ of the first linkage 150_1 is pivotably connected to the support arm 124_2 via a pivot 180_2, a tip ends of the first link 160_a_ of second linkage 150_2 is pivotably connected to support arm 124_1 via pivot 180_2, and a tip ends of the second link 160_b_ of the second linkage 150_2 is pivotably connected to the support arms 124_2 via pivot 180_4. The pivots 180 may collectively be referred to as second pivots 180.

The connections between the linkages 150_1 and 150_2 and the arms 124_1 and 124_2 is possible due to latitudinal slots 140_2 provided in a body of the support arm mount 112 of the mounting plate assembly 110. Specifically, the pivots 180 which connect the first and second links 160_a_ and 160_b_ of the linkages 150 to the arms 124 are inserted through the latitudinal slots 142 of the support arm mount 112 (in some examples, each pivot 180 is inserted through a corresponding one of the latitudinal slots 142). Accordingly, the latitudinal slots 142 allow the connection between the linkages 150_1 and 150_2 and the arms 124_1 and 124_2 through the apertures of the slots 142. The latitudinal slots 142 are elongated along a directions parallel to a latitudinal dimension of the ceiling mount 100 and thus allow movement of the pivots 180_1 to 180_4 along this dimension; in other words, the latitudinal slots 142 constrain or restrict the pivots 180_1 to 180_4 to a single degree of freedom of motion, i.e., translation along a latitudinal direction.

Turning to the linkages 150, the first linkage 150_1 and the second linkage 150_2 each include a set of two links, i.e., the first links 160_a_ and the second links 160_b_ that are connected to each other via the shared central pivot 170. This pivot 170 may also be referred to as a first pivot 170, to distinguish it from the second pivots 180. Consequently, two ends of each link 160_a_ or 160_b_ are the free ends of the links, while the other (non-free) ends of the links are connected at the central pivot 170, which constitute central portions of each respective linkage 150. Further, the first links 160_a_ can pivot relative to the second link 160_b_ around the first pivot 170. This relative movement between the links 160_a_ and 160_b_ renders each linkage 150 collapsible and extendable, i.e., movable from a collapsed position of a linkage in which the tip ends of the linkages are relatively close together, to an extended position of a linkage in which the tip ends of the linages are relatively rather apart.

In some examples, within a given linkage 150, the first link 160_a_ may have the same length as the second link 160_b_. Moreover, in some examples, the first link 160_a_ of first linkage 150_1 may be the same length as the first link 160_a_ of the second linkage 150_2, and similarly their respective second links 160_b_ may also have the same length. This symmetry of the links, together with the constraints imposed by the slots 141 and 142, allows the linkages 150_1 and 150_2 to collapse/expand in coordination. This coordinated motion can produce a self-centering effect for the clips 120, hold the clips 120 parallel to one another, and/or ensure the clips move together (in opposite directions), which will be explained subsequently. In an example where the linkages 150_1 and 150_2 are made in such a way as a set, their ends, i.e., the free ends of their constitutive links 160_1 and 160_2, are affixed to the support arms 124_1 and 124_2. The connecting mechanism, i.e., pivot 180, such as, e.g., a pin, rivet, stud, or the like, can be inserted through the latitudinal slots 142 of the mounting plate assembly 110. Being that the pivot 180 is then guided to move (slide) along the slots 142 in a latitudinal direction, the clips 120_1 and 120_2 can move inwards and outwards along the latitudinal direction. As a result of the movement of the clips 120_1 and 120_2, the linkages 150_1 and 150_2 that are affixed to the arms 124_1 and 124_2 extend and collapse. In one example, the latitudinally outward movement of the arms 124_1 and 124_2 extends the linkages 150_1 and 150_2 and, vice versa, the latitudinally inward movement of the arms 124_1 and 124_2 collapses the linkages 150_1 and 150_2 around the sliding first pivot 170_1 and second pivot 170_2.

In addition, during the extension/collapsing motion of the linkages 150_1 and 150_2, the movement of the first pivot 170_1 and the second pivot 170_2, respectively, is guided along a restricting path. Namely, the mounting plate assembly 110 further includes a set of longitudinal slots 141 that are positioned in between sets of latitudinal slots 142 and are elongated in a direction perpendicular to the direction of the latitudinal slots 140_2, i.e., in a longitudinal direction. Moreover, the first pivots 170 each include protrusions that are formed to fit the longitudinal slots 141 to be slidably inserted into the slots 141. In one example, each first pivot 170 has a corresponding slot among the longitudinal slots 141. The slidable motions of the first pivots 170 are mutually coordinated along the slots 141. Moreover, the slidable motions of the first pivots 170 are further coordinated to be the results of the latitudinally inward/outward movement of the clips 120_1 and 120_2, which, in turn, extend/collapse the linkages 150_1 and 150_2. Specifically, starting from a fully extended position of the linkages 150_1 and 150_2, when the clips 120_1 and 120_2 are in a farthest outward position along the latitudinal slots 140_2, the inward force acting on the clips 120_1 and 120_2 moves the clips latitudinally inward. Consequently, the second pivots 180, which are coupled to the clips 120, are moved latitudinally inward along the latitudinal slots 142. This latitudinal movement of the second pivots 180 causes the linkages 150 to collapse respectively around their first pivots 170. At the same time, being that the first pivots 170 are slidably inserted into the longitudinal slots 141 the collapsing of the linkages 150 causes the pivots 170 to translate longitudinally along the slots 141. Thus, the pivots 170 are guided longitudinally along their corresponding longitudinal slots 141 while the pivots 180 are guided latitudinally inward along their corresponding latitudinal slots 142. Conversely, if the clips 120 are moved in the opposite direction (i.e., away from each other), the pivots 170 and 180 would move in directions opposite to those described above, and consequently the linkages 150 would extend. In one example, the sizes and the positions of the linkages 150_1 and 150_2, the latitudinal slots 142, and the longitudinal slots 141 are mutually selected so that once the pivots 180 reach the most-inward ends of the latitudinal slots 142, the pivots 170 reach the most-inward ends of the longitudinal slots 141, and once pivots 180 reach the most-outward ends of the latitudinal slots 142, the pivots 170 reach the most-outward ends of the longitudinal slots 141.

The coordinated slidable motions of the first pivot 170_1 and the second pivot 170_2 accomplish a self-centering effect in regard to the clips 120_1 and 120_2. Namely, as the first pivot 170_1 and the second pivot 170_2 slide along their corresponding slots 140_1 that are longitudinally aligned, the clips 120_1 and 120_2 travel the same distance inward or outward with respect to the longitudinal symmetry pivot of the mounting plate assembly 110. Such symmetrical movement of the clips 120_1 and 120_2 result in the engagement members 122_1 and 122_2 also remaining symmetrically positioned relative to the longitudinal pivot of the mounting plate assembly 110. The symmetrically positioned engagement members 122_1 and 122_2 are then, in turn, properly placed to engage with flanges 91_1 and 91_2 of the ceiling rail 90. In this manner, the spacing between the engagement members 122_1 and 122_2 adjusts for the size of the ceiling rail 90 that the members 122_1 and 122_2 engage with, while preventing the size adjustment from disturbing the symmetry of the rail 90 positioning within the ceiling mount 100.

As the clips 120 are moved relative to one another, there are multiple positional arrangements of the clips 120 between the farthest outward and the farthest inward arrangements that can be locked in place. The multiple positional arrangements are defined by a locking pin receiver 130 in the mounting plate assembly 110. The locking pin receiver 130 is a rigid structure (e.g., a bracket, a flange, etc.) which is either an integral portion of the mounting plate assembly 110 or which is attached to the mounting plate assembly 110 and positioned on one of the sides of the assembly 110. The locking pin receiver 130 extends along the latitudinal dimension and comprises a plurality of apertures which are arranged at predetermined positions distributed along the latitudinal dimension. These predetermine positions correspond to the above-mentioned positional arrangements of the clips 120. In one example, there are four apertures in the locking pin receiver 130, but it is contemplated that there can be as many apertures as it is desired. The apertures in the locking pin receiver 130 operate in interaction with a locking pin 128 included in one of the clips 120_1 and 120_2. The action of the locking pin 128 is synchronized with the movement of the clips 120_1 and 120_2 inward and outward latitudinally. The locking pin 128 is either coupled to or integral with one of the clips 120_1 and 120_2 and arranged such that an engagement portion thereof extends along a latitudinal direction towards the locking pin receiver 130. The locking pin 128 include a pulling (or pushing) mechanism (handle) that allows the engagement portion thereof to be retracted or extended. When the engagement portion is extended, it protrudes along the latitudinal direction beyond a face of the locking pin receiver 130, and thus in the extended state the engagement portion may extend into an aperture of the locking pin receiver 130 if aligned therewith. When the pin portion is retracted, it does not protrude beyond the face of the locking pin receiver 130 and thus cannot extend into an aperture thereof (regardless of alignment). As the clips 120_1 and 120_2 slide latitudinally, the position of the locking pin 128 sequentially aligns with the apertures of the locking pin receiver 130, and when so aligned with a given aperture the pin 128 can be inserted into the aperture it aligns with by extending the engagement portion. Once the pin 128 is inserted into the aligned aperture, the sliding motion of the clips 120_1 and 120_2 is prevented by the interaction between the locking pin 128 and the locking pin receiver 130, i.e., the locking pin 128 locks the clips 120_1 and 120_2 in place. Specifically, the locking pin receiver 130 prevents the locking pin 128 from moving, and because the locking pin 128 is attached to one of the clips 120, this also prevents that clip 120 from moving. Moreover, because the motion of the clips 120 is coordinated by the linkages 150 and the mounting plate 111, when the locking pin 128 prevents the clips 120 to which is attached from moving, the linkages 150 automatically also prevent the other clip 120 from moving. Thus, a single locking pin 128 can be used to lock both of the clips 120. The locations of the various apertures in the locking pin receiver 130 are thus correlated with positional arrangements of the clips 120, and the clips 120 can thus be locked in a desired positional arrangement by engagement the locking pin 128 with the aperture corresponding to the desired positional arrangement. These positional arrangements of the clips 120, and hence the corresponding locations of the apparatus in the locking pin receiver 130, may be selected so as to correspond to various ceiling rail widths. In some examples, the locking pin receiver 130 is configured with apertures corresponding to positions of the clips 120 suitable for mounting to a ceiling rail with ⁹⁄₁₆ inches flange width, ¹⁵⁄₁₆ inches flange width, and 1½ inches flange width.

The technical effect of locking the clips 120_1 and 120_2 in place is that the distance between engagement members 122_1 and 122_2 is also locked in place. As shown in FIG. 2, the engagement members 122_1 and 122_2 engage with flanges 91_1 and 91_2 of the ceiling rail 90. In this manner, certain common industry (or otherwise predetermined) sizes of ceiling rails 90 can be accommodated by the ceiling mount 100 by having the members 122_1 and 122_2 engage with the flanges 91_1 and 91_2 of the ceiling rails 90. And once the clips 120_1 and 120_2 are capable of being locked in place at a distance from each other based on the several preset positions of the locking apertures portion 130, then the engagement members 122_1 and 122_2 are capable of engaging with several corresponding sizes of ceiling rails 90. In one example, the ceiling rail 90 is ⁹⁄₁₆ inches in size, in another example, the rail 90 is ¹⁵⁄₁₆ inches in size, and in yet another example, the rail 90 is 1½ inches in size.

Figure 3:
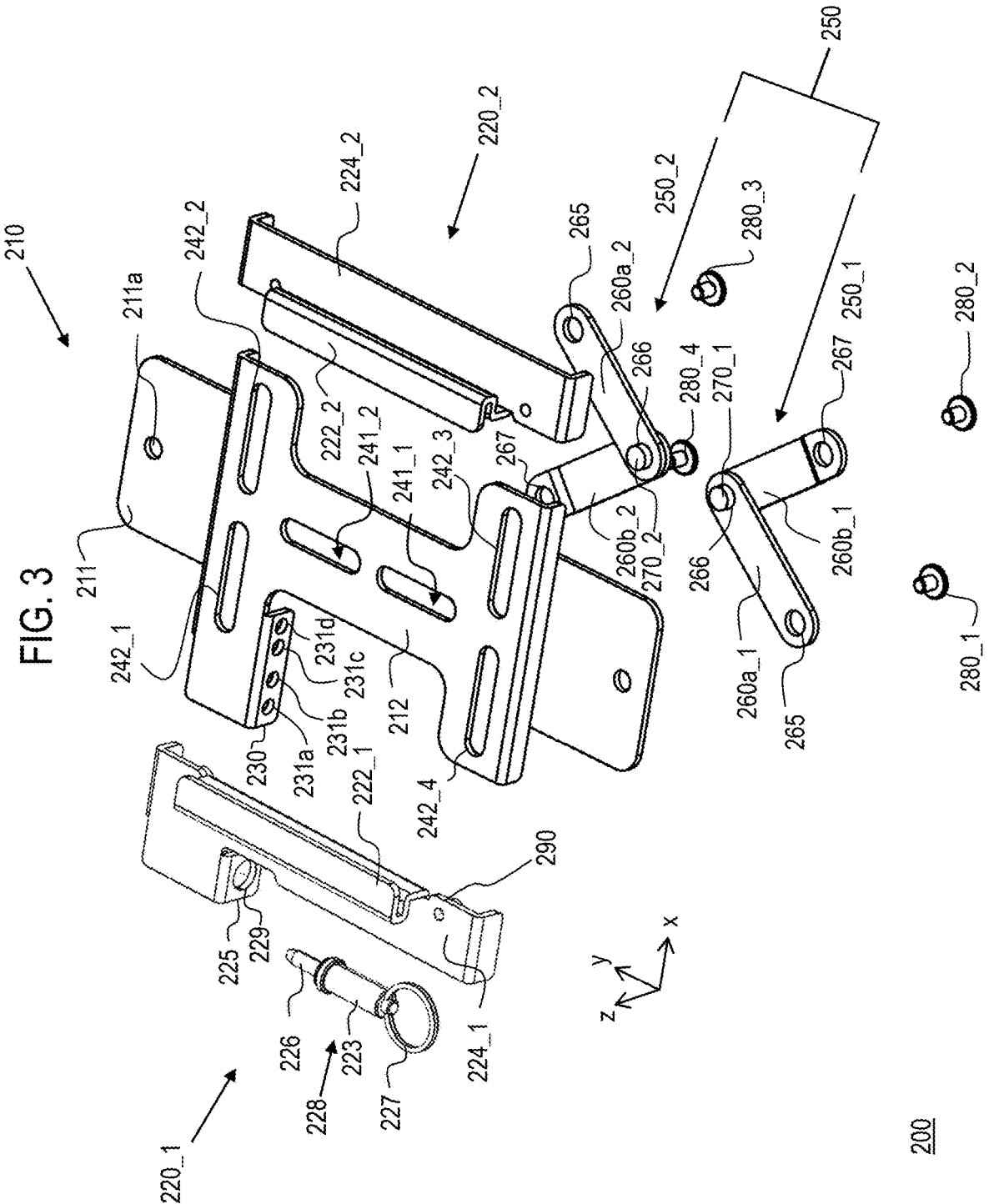
FIG. 3 is an exploded perspective view of another ceiling mount, which is one example configuration of the ceiling mount of FIG. 1.

Turning to FIG. 3, another ceiling mount 200 will be described. The ceiling mount 200 is an example implementation of the ceiling mount 100. Some components of the ceiling mount 200 thus correspond to (i.e., are implementation examples of) components of the ceiling mount 100, and such corresponding components are given similar reference numbers having the same last two digits, such as 110 and 210. Although the ceiling mount 200 is one example implementation of the ceiling mount 100, the ceiling mount 100 is not limited to the ceiling mount 200.

As shown in FIG. 3, the ceiling mount 200 comprises a mounting plate assembly 210, two linkages 250, and two clips coupled to the mounting plate assembly 210, specifically a first clip 220_1 and a second clip 220_2. The mounting plate assembly 210 comprises a mounting plate 211, support arm mount 212, locking pin receivers 230, longitudinal sliding slots 241, and latitudinal sliding slots 242. The locking pin receivers 230 further include locking pin positions 231a-d, each of which are apertures arranged in a latitudinal direction X to accommodate multiple locked positions of the clips 220 relative to each other and/or to the mounting plate assembly 210. Additionally, the longitudinal sliding slots 241 include two slots 241_1 and 241_2, while latitudinal sliding slots 242 include four (two sets of two) slots, a first set of slots 242_1 and 242_2, and a second set of slots 242_3 and 242_4.

Each of the clips 220_1 and 220_2 comprises an engagement member 222_1 and 222_2, and one or more support arms 224_1 and 224_2, respectively, with one of the support arms 224_1 and 224_2 of each of the clips 220_1 and 220_2 comprising a locking mechanism 228. The engagement members 222 each comprise a support portion which extends from the corresponding support arm 224 and a horizontal flange which extends from the support and is configured to engage with a ceiling rail. The engagement members 222 may also each comprise a groove or slot which is defined by a bended portion of the support portion and by the horizontal flange, with the slot being configured to receive a portion of the ceiling rail. The horizontal flanges and the slots of the support arms 224_1 and 224_2 extend parallel to one another along the longitudinal dimension (y-axis). The support arm 224 which comprises the locking mechanism 228 (i.e., the support arm 224_1 in the example illustrated in FIG. 3) comprises a locking mechanism mount 225 to which the locking mechanism 228 is attached. The locking mechanism mount 225 may comprise, for example, a vertical flange extending from a horizontal portion of arm 224 and comprising an aperture 229. The locking mechanism 228 further includes a body 223, a spring-loaded handle 227 and a locking pin 226. The body 223 is attached to the support arm 224_1 (e.g., via insertion through aperture 229. Handle 227 is movable relative to a body 223 (and hence relative to arm 224_1) along the longitudinal dimension (y-axis) and is connected to the locking pin 226 such that movement of the handle 227 causes movement of the locking pin 226 relative to a body 223 and arm 224_1 along the longitudinal dimension (y-axis). A spring mechanism biases the locking pin 226 towards an extended position. The locking pin 226 is configured to, when extended, engage with the locking pin receiver 230 to lock the positions of the clips 220 relative to the mounting plate 210 and to, when retracted, disengage from the locking pin receiver 230 to allow motion of the clips 220. Thus, to enable movement of the clip 220_1 along the latitudinal direction X, the spring-loaded handle 227 is first pulled to disengage the locking pin 226 from the locking pin receiver 230, and then while continuing to hold the spring-loaded handle 227, the clip 220_1 can be moved until it is in a desired position in which the locking pin 226 is aligned with one of the locking pin positions 231*a-d* in the locking pin receiver 230, each locking pin position 231*a-d* corresponding to an aperture in the locking pin receiver 230. Once the locking pin 226 is aligned with one of the locking pin positions 231*a-d*, the spring-loaded handle 227 is released and the spring urges the locking pin 226 to move towards the extended position such that it is accommodated by the one of the locking pin positions 231*a-d*. In this manner, the mating of the pin 226 and the locking pin receivers 230 locks/prevents movement of the clip 220_1 in the latitudinal direction X, and, accordingly, the movement of the clip 220_2, as well, which will be described in greater detail below.

Figures 4A, 4B:
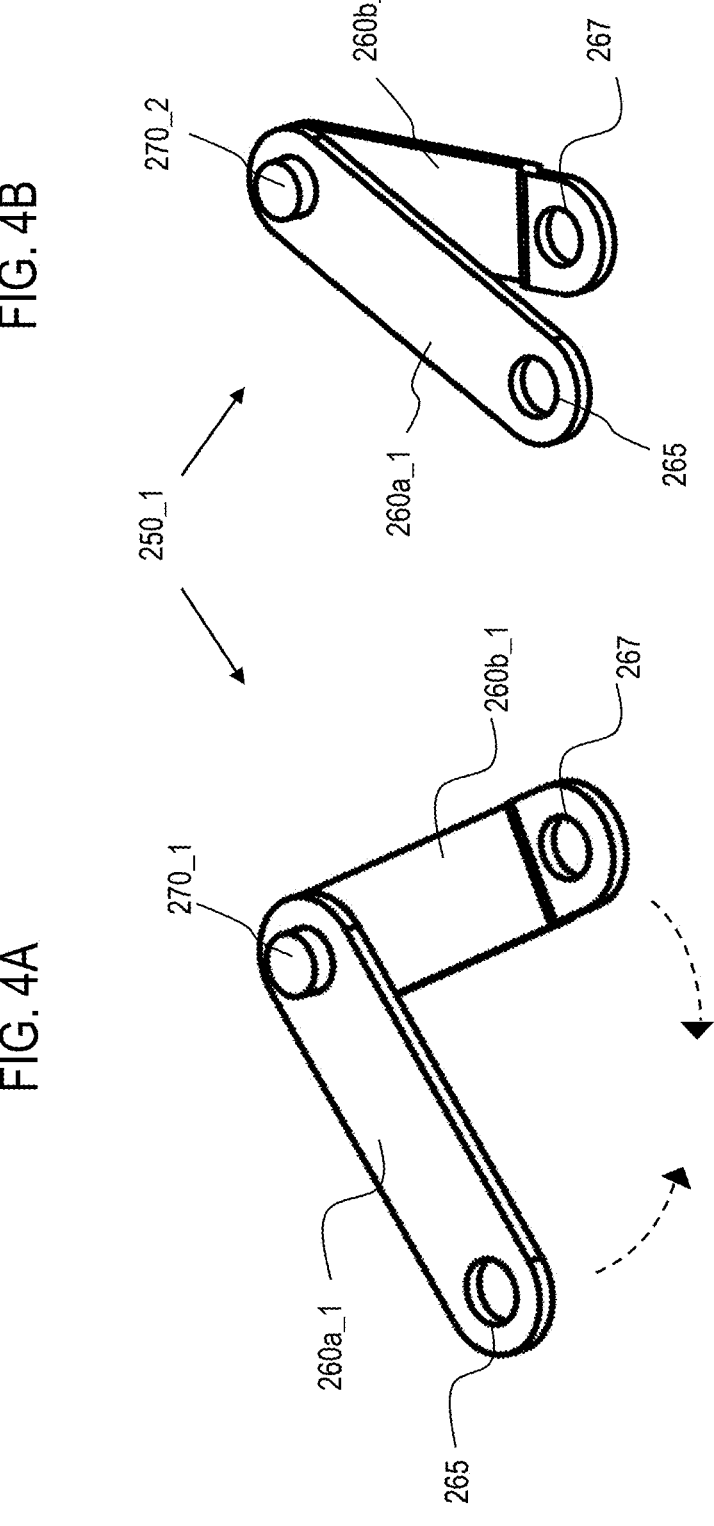
FIGS. 4A and 4B are perspective views of a linkage of the ceiling mount of FIG. 3.

Further, each of the two linkages 250, a first linkage 250_1 and a second linkage 250_2, includes a first set of two links 260*a*_1 and 260*b*_1 and a second set of two links 260*a*_2 and 260*b*_2. Moreover, each of the two linkages 250, a first linkage 250_1 and a second linkage 250_2, includes a first pivot 270_1 and a second pivot 270_2, such that the first pivot 270_1 connects the first two links 260*a*_1 and 260*b*_1 to form the first linkage 250_1, and the second pivot 270_2 connects the second two links 260*a*_2 and 260*b*_2 to form the second linkage 250_2, as shown in FIGS. 4A and 4B.

The mounting plate assembly 210 structurally supports the other components of the ceiling mount 200, such as the two linkages 250, and the clips 220_1 and 220_2. The mounting plate assembly 210 is coupled to the clips 220_1 and 220_2 via the support arm mount 212, as will be described in greater detail below. In addition, the mounting plate 211 is configured to be coupled to an electronic device, and when so coupled the mounting plate assembly 210 acts as an intermediary that linkages the clips 220_1 and 220_2 to the electronic device. In some examples, the mounting plate 211 is distinct from and removably couplable to the electronic device, for example via removable fasteners 211*a* (e.g., screws, snap fittings, or any other removable attachment technique). In other examples, the mounting plate 211 may be permanently coupled to the electronic device. For example, in some implementations the mounting plate 211 may be an integral part of or may be permanently attached to a chassis of the electronic device, for example by welding, friction or press fitting, permanent fasteners (e.g., rivets) or any other permanent attachment technique.

As noted above, the clips 220_1 and 220_2 are coupled to the mounting plate assembly 210. Specifically, each of the clips 220_1 and 220_2 comprises one or more support arms 224_1 and 224_2 that are coupled to the mounting plate assembly 210 by engaging with corresponding support arm mount 212 coupled to the mounting plate 211. The support arm mount 212 provides an interface for each support arm 224_1 and 224_2, as well as for the linkages 250. For example, the mounting plate assembly 210 is placed between the clips 220_1 and 220_2 and the linkages 250_1 and 250_2.

Therefore, in implementations in which the clips 220_1 and 220_2 comprise corresponding support arms 224_1 and 224_2, the support arm mount 212 is used for guiding the support arms 224_1 and 224_2 so that the arms 224_1 and 224_2 can slide over the mount 212 in a restricted manner. At the same time, the arms 224_1 and 224_2 are connected to the linkages 250_1 and 250_2. Further, both linkages 250_1 and 250_2 are connected to both arms 224_1 and 224_2, with the mounting plate assembly 210 being placed between the linkages 250_1 and 250_2 and the arms 224_1 and 224_2. The connection between the linkages 250_1 and 250_2 and the arms 224_1 and 224_2 is possible due to multiple latitudinal slots 242 provided in a body of the support arm mount 212 of the mounting plate assembly 210. Specifically, the first set of two links 260*a*_1 and 260*b*_1 and the second set of two links 260*a*_2 and 260*b*_2 of the linkages 250_1 and 250_2 are affixed at their ends 265 and 267 to multiple attachment locations 290 of both arms 224_1 and 224_2 via attachment mechanisms 280_1 to 280_4, which can be screws, pins, rivets, studs, or the like. The attachment mechanisms 280_1 to 280_4 are inserted through the latitudinal slots 240_2 of the support arm mount 212. Accordingly, the latitudinal slots 242 allow the connection between the linkages 250 and the arms 224 through the apertures of the slots 242. The latitudinally (direction X in FIG. 3) elongated shapes of the slots 242 allow pivoting movement of the attachment mechanisms 280, restricted to a single degree of freedom of motion, such as latitudinal direction X. In one example, the two sets of latitudinal slots 242 are symmetrically positioned relative to the latitudinal of the mounting plate assembly 210.

Turning to the linkages 250, the first linkage 250_1 and the second linkage 250_2 each include a set of two links, i.e., the first links 260*a*_1 and 260*b*_1 and the second links 260*a*_2 and 260*b*_2 that are connected to each other respectively via the first pivot 270_1 and the second pivot 270_2, as illustrated by FIGS. 4A and 4B. Consequently, two ends of each linkage are the free ends 265 and 267 of the links 260_1 and 260_2, while the other (non-free) ends of the links 266 are connected at the first pivot 270_1 and the second pivot 270_2, which constitute central portions of each respective linkage. Further, the first links 260*a*_1 and 260*b*_1 can move relative to each other in a manner resembling the hands of a clock around the first pivot 270_1, as shown in FIGS. 4A and 4B. Similarly, the second links 260*a*_2 and 260*b*_2 can move relative to each other in a manner resembling the hands of a clock around the second pivot 270_2. This relative movement of the links renders a linkage that includes the links collapsible and extendable from a position where the links overlap, i.e., the collapsed position of a linkage, to a position where the ends of two links of a linkage point in opposite directions, i.e., the fully extended position of a linkage, and back.

Figures 5A, 5B:
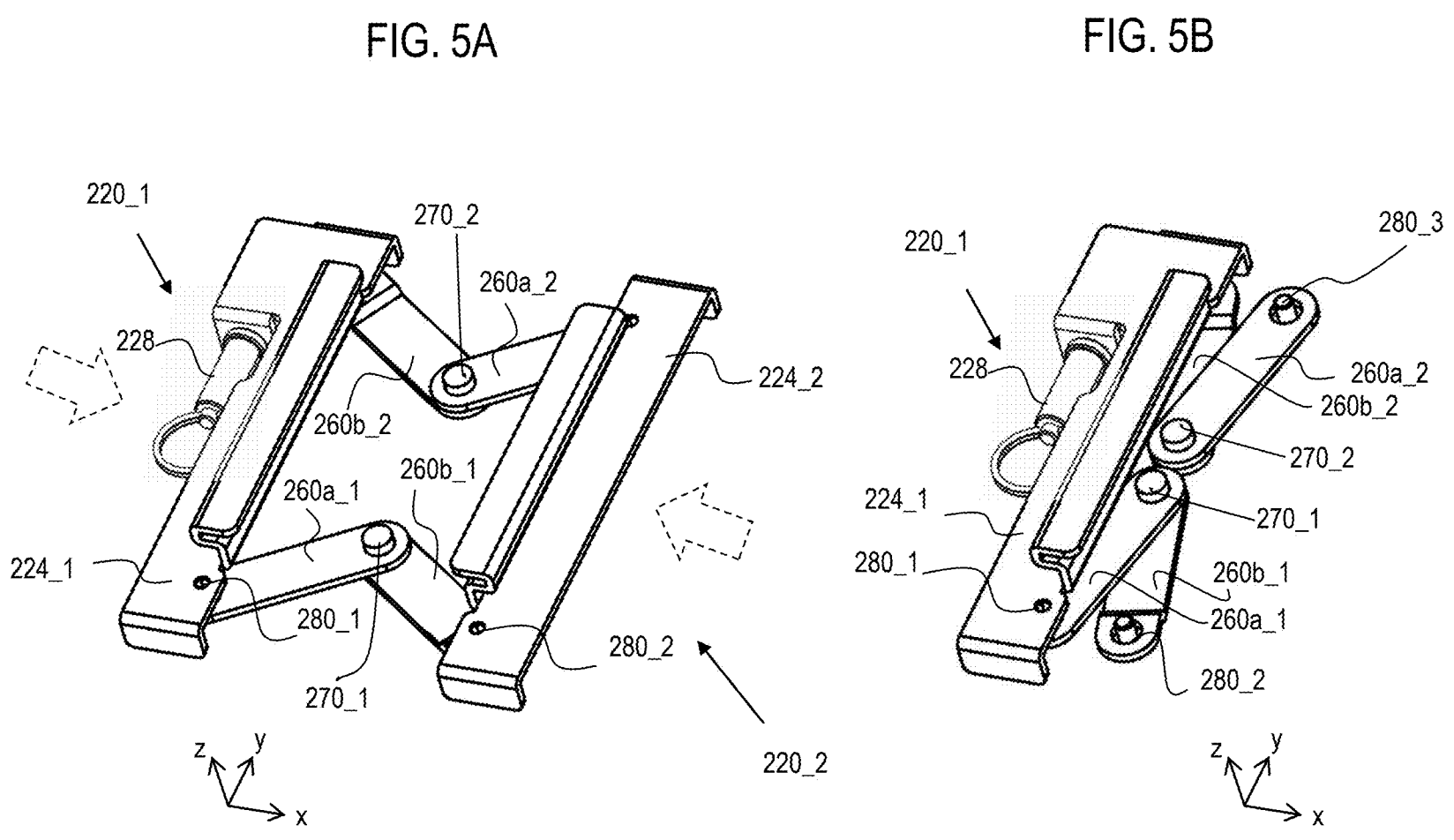

In an example where two extendable/collapsible linkages 250 are included in the ceiling mount 200 structure, their constitutive links 260 may be of the same respective length within each linkage 250. The links 260 of two separate linkages may further be of the same length, as depicted in FIGS. 5A and 5B. This symmetry of the links allows the linkages 250 to collapse/expand in coordination, thereby accomplishing a self-centering effect, which will be explained subsequently. In an example where the linkages 250 are made in such a way as a set, their ends, i.e., the free ends of their constitutive links 260, are affixed to the support arms 224. The attachment mechanisms 280, such as, e.g., a screw, pin, rivet, stud, or the like, can be inserted through the latitudinal slots 242 of the mounting plate assembly 210. Being that the attachment mechanisms 280 between the arms 224 and the linkages 250 are then guided to move (slide) along the slots 242 in the latitudinal direction X, the clips 220 can move inwards and outwards along the latitudinal direction X. As a result of the movement of the clips 220, the linkages 250 that are affixed to the arms 224 expand or collapse once force is exerted in the latitudinal direction X, as shown in in FIGS. 5A and 5B. In one example, the latitudinally outward movement of the arms 224 expands the linkages 250 and, vice versa, the latitudinally inward movement of the arms 224 illustrated in FIG. 5A, collapses the linkages 250_1 and 250_2 around the first pivot 270_1 and the second pivot 270_2, as presented in FIG. 5B.

Figure 6:
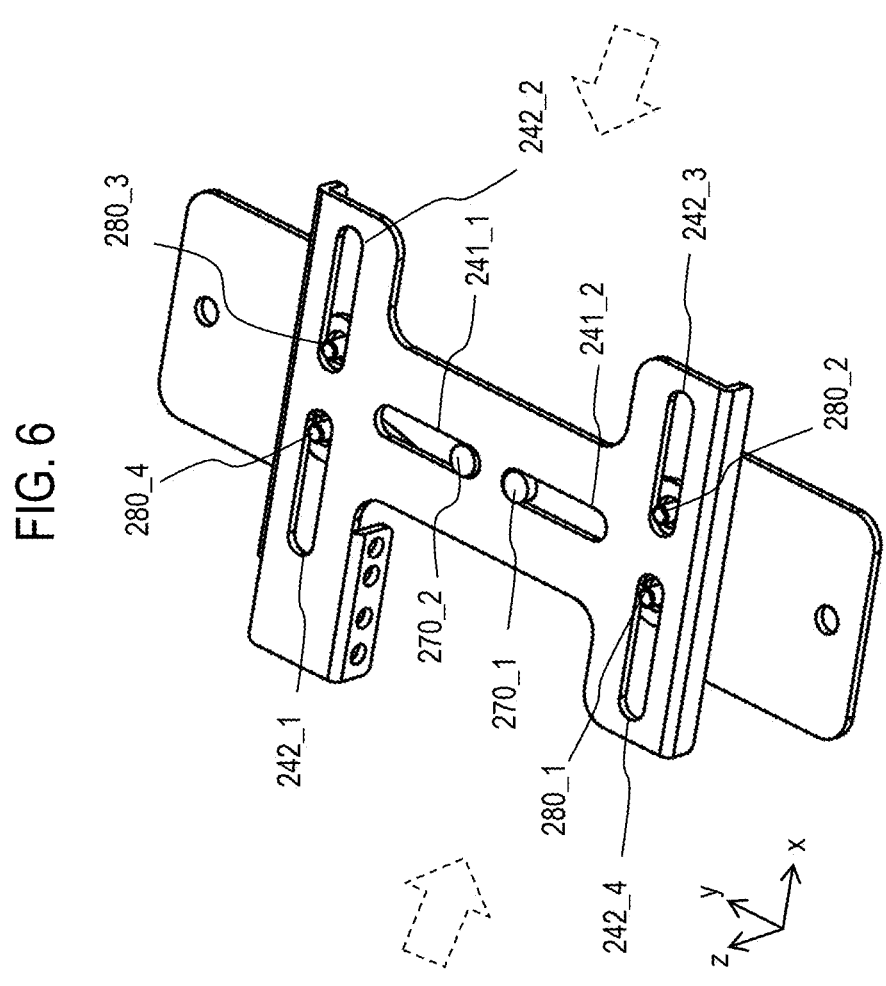
FIG. 6 is a perspective view of a portion of the ceiling mount of FIG. 3 comprising two of the linkages and a mounting plate assembly engaged with one another.

In addition, during the extension/collapsing motion of the linkages 250, the movement of the first pivot 270_1 and the second pivot 270_2, respectively, is guided along a restricted path. Namely, the mounting plate assembly 210 further includes a set of longitudinal slots 241 that are positioned in between sets of latitudinal slots 242 and are elongated in a direction perpendicular to the direction of the latitudinal slots 242, i.e., in a longitudinal direction Y. Moreover, the first pivot 270_1 and the second pivot 270_2 each include protrusions that are formed to fit the longitudinal slots 241 to be slidably inserted into the slots 241. In one example, each of the first pivot 270_1 and the second pivot 270_2 has a corresponding slot among the longitudinal slots 241. The slidable motions of the first pivot 270_1 and the second pivot 270_2 are mutually coordinated along the slots 241. Moreover, the slidable motions of the first pivot 270_1 and the second pivot 270_2 are further coordinated to be the results of the latitudinally inward/outward movement of the clips 220, which, in turn, extend/collapse the linkages 250, as shown in FIG. 6. Specifically, starting from a fully extended position of the linkages 250, when the clips 220 are in a farthest outward position along the latitudinal slots 242, the inward force acting on the clips 220 moves the clips latitudinally inward (see FIG. 7B). Consequently, the linkages 250 collapse respectively around the first pivot 270_1 and the second pivot 270_2. At the same time, being that the first pivot 270_1 and the second pivot 270_2 are slidably inserted into the longitudinal slots 241, the linkages 250 are collapsed into V-shapes, where the vertices of the collapsed V-shapes are the first pivot 270_1 and the second pivot 270_2. Thus, the slidably inserted vertices are guided along their corresponding slots 241 longitudinally inward with respect to the mounting plate assembly 210. In one example, the sizes and the positions of the linkages 250, the latitudinal slots 242, and the longitudinal slots 241 are mutually adjusted so that once the clips 220 reach the most-inward end of the latitudinal slots 242, the pivots 270_1 and 270_2 reach the most-inward end of the longitudinal slots 241 (See FIG. 6).

Figures 7A, 7B:
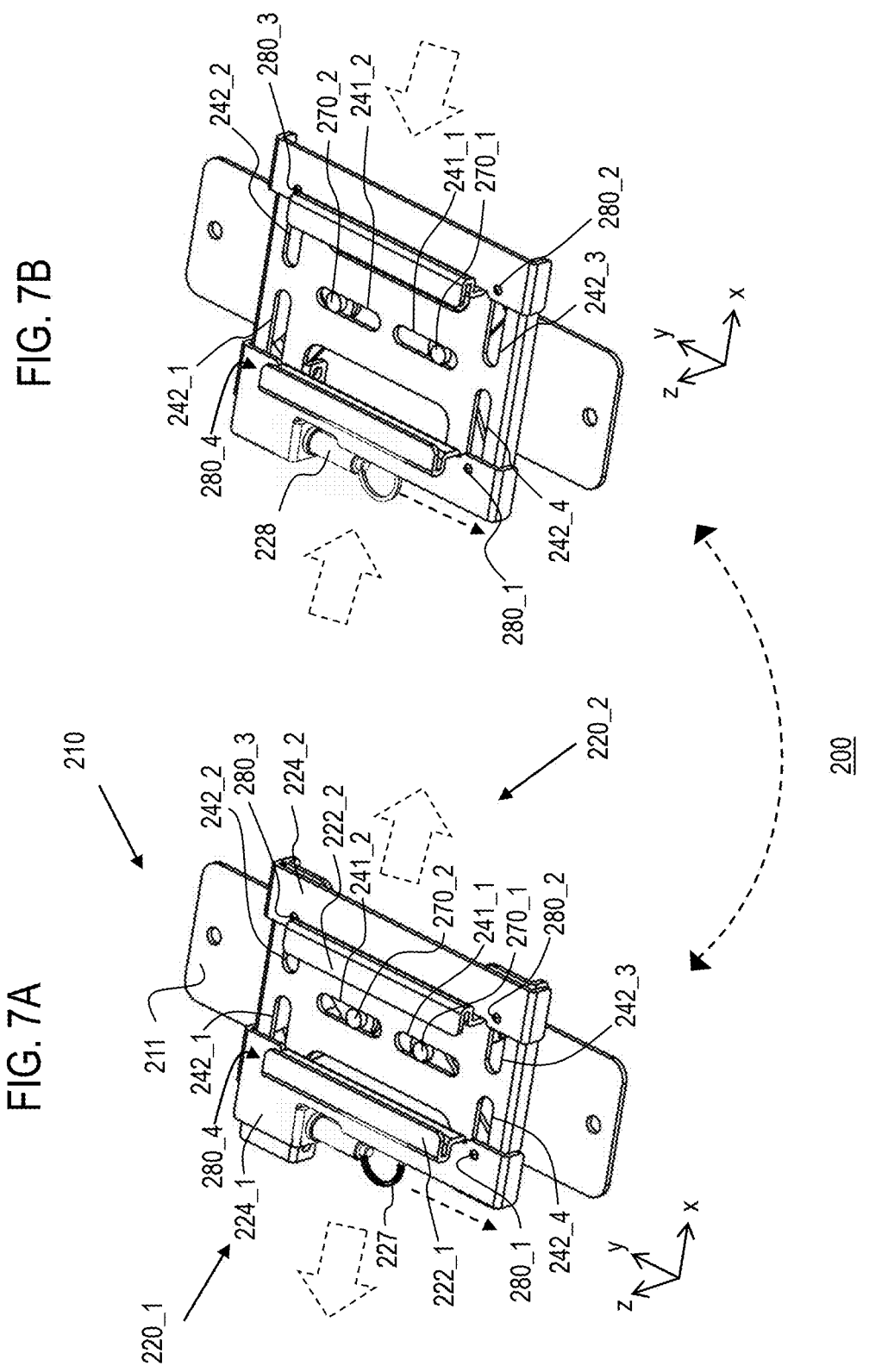
FIGS. 7A and 7B are perspective views the ceiling mount of FIG. 3.
Figure 8:
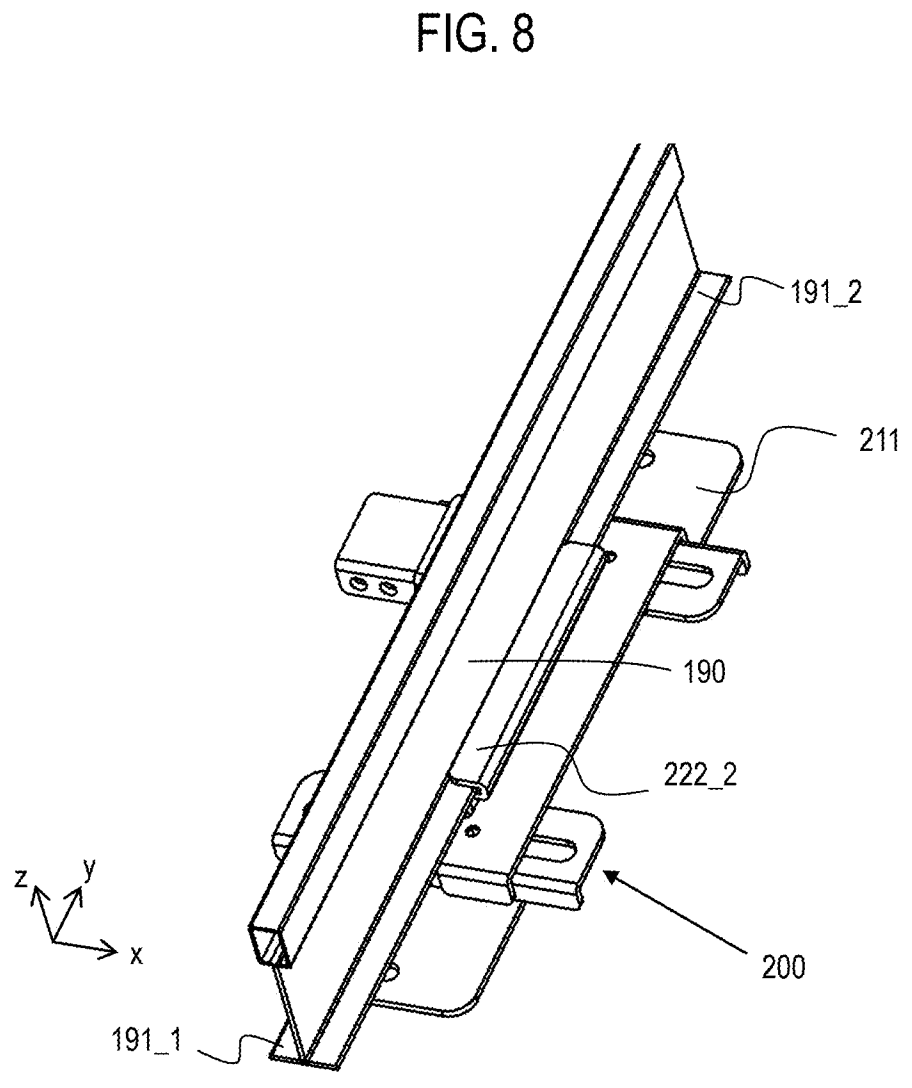

The coordinated slidable motions of the first pivot 270_1 and the second pivot 270_2 accomplish a self-centering effect in regard to the clips 220 as shown in FIGS. 7A and 7B. Namely, as the first pivot 270_1 and the second pivot 270_2 slide along their corresponding slots 240_1 that are longitudinally aligned, the clips 220 travel the same distance inward or outward with respect to the longitudinal symmetry pivot of the mounting plate assembly 210. Such symmetrical movement of the clips 220 results in the engagement members 222 also remaining symmetrically positioned relative to the longitudinal axis of the mounting plate assembly 210. As shown in FIG. 8, the symmetrically positioned engagement members 222 are then, in turn, properly placed to engage with flanges 191_1 and 191_2 of the ceiling rail 190. In this manner, the spacing between the engagement members 222_1 and 222_2 adjusts for the size of the ceiling rail 90 that the members 222_1 and 222_2 engage with, while preventing the size adjustment from disturbing the symmetry of the rail 190 positioning within the ceiling mount 200.

Similarly, starting from a fully collapsed position of the linkages 250, when the clips 220 are in a farthest inward position along the latitudinal slots 242, the outward force acting on the clips 220 moves the clips latitudinally outward (see FIG. 7A). Consequently, the linkages 250 extend respectively around the first pivot 270_1 and the second pivot 270_2. At the same time, being that the first pivot 270_1 and the second pivot 270_2 are slidably inserted into the longitudinal slots 241, the linkages 250 are extended out from their initial V-shapes, where the vertices of the extending V-shapes are the first pivot 270_1 and the second pivot 270_2. Thus, the slidably inserted vertices are guided along their corresponding slots 241 longitudinally outward with respect to the mounting plate assembly 210. In one example, the sizes and the positions of the linkages 250, the latitudinal slots 242, and the longitudinal slots 241 are mutually adjusted so that once the clips 220 reach the most-outward ends of the latitudinal slots 242, the pivots 270_1 and 270_2 reach the most-outward ends of the longitudinal slots 241.

The linkage extending/collapsing motion includes multiple positions between the farthest outward position and the farthest inward position that can be locked in place. The multiple positions are defined by locking pin receivers 230 in the mounting plate assembly 210. The locking pin receivers 230 belong to an extended portion of the mounting plate assembly 210 on one of the sides of the assembly 210. In one example, there are four positions 231*a-d* in the locking pin receivers 230, but it is contemplated that there can be as many apertures as it is desirable. The apertures in the locking pin receivers 230 operate in interaction with a locking mechanism 228 included in one of the clips 220. The action of the locking mechanism 228 is synchronized with the movement of the clips 220 inward and outward latitudinally. The locking mechanism 228 is integral with one of the clips 220 and it includes a spring-loaded handle 227 that allows a locking pin 226 to protrude into one of the apertures, i.e., positions 231*a-d*, of one of the arms 224 of the clips 220. As the clips 220 slide latitudinally, the position of the locking pin 226 aligns with one of the positions 231*a-d*, when the pin 226 can be inserted into the aperture it aligns with. Once the spring-loaded handle 227 of the locking mechanism 228 is released, the pin 226 is inserted into the aligned aperture and the sliding motion of the clips 220 is prevented by locking the clips 220 in place.

The technical effect of locking the clips 220 in place is that the distance between engagement members 222 is also locked in place. As shown in FIG. 8, the engagement members 222_1 and 222_2 engage with flanges 191_1 and 191_2 of the ceiling rail 190. In this manner, certain common industry (or otherwise predetermined) sizes of ceiling rails 190 can be accommodated by the ceiling mount 200 by having the members 222_1 and 222_2 engage with the flanges 191_1 and 191_2 of the ceiling rails 190. And once the clips 220_1 and 220_2 are capable of being locked in place apart from each other based on the several preset positions of the locking pin receivers 230, then the engagement members 222_1 and 222_2 are capable of engaging with several corresponding sizes of ceiling rails 190. In one example, the ceiling rail 190 is $\frac{9}{16}$ inches in size, in another example, the rail 190 is $\frac{15}{16}$ inches in size, and in yet another example, the rail 190 is $1\frac{1}{2}$ inches in size.

It is to be understood that both the general description and the detailed description provide example implementations that are explanatory in nature and are intended to provide an understanding of the present disclosure without limiting the scope of the present disclosure. Other examples in accordance with the present disclosure will be apparent to those skilled in the art based on consideration of the disclosure herein. For example, various mechanical, compositional, structural, electronic, and operational changes may be made to the disclosed examples without departing from the scope of this disclosure, including for example the addition, removal, alteration, substitution, or rearrangement of elements of the disclosed examples, as would be apparent to one skilled in the art in consideration of the present disclosure. Moreover, it will be apparent to those skilled in the art that certain features or aspects of the present teachings may be utilized independently (even if they are disclosed together in some examples) or may be utilized together (even if disclosed in separate examples), whenever practical. In some instances, well-known circuits, structures, and techniques have not been shown or described in detail in order not to obscure the examples. Thus, the following claims are intended to be given their fullest breadth, including equivalents, under the applicable law, without being limited to the examples disclosed herein.

References herein to examples, implementations, or other similar references should be understood as referring to prophetic or hypothetical examples, rather than to devices that have been actually produced (e.g., prototypes), unless explicitly indicated otherwise. Similarly, references to qualities or characteristics of examples should be understood as estimates or expectations based on an understanding of the relevant physical principles involved, application of theory or modeling, and/or past experiences of the inventors, rather than as the results of tests carried out on a physical device, unless explicitly indicated otherwise.

Further, spatial, positional, and relational terminology used herein is chosen to aid the reader in understanding examples of the invention but is not intended to limit the invention to a particular reference frame, orientation, or positional relationship. For example, spatial, positional, and relational terms such as "horizontal," "vertical," "up," "down," "lateral," "beneath," "below," "lower," "above," "upper," "proximal," "distal," and the like may be used herein to describe directions or to describe one element's or feature's spatial relationship to another element or feature as illustrated in the figures. These spatial terms are used relative to reference frames in the figures and are not limited to a particular reference frame in the real world. Furthermore, if a different reference frame is considered than the one illustrated in the figures, then the spatial terms used herein may need to be interpreted differently in that different reference frame. Moreover, the poses of items illustrated in the figure are chosen for convenience of illustration and description, but in an implementation in practice the items may be posed differently.

In addition, the singular forms "a," "an," and "the" are intended to include the plural forms as well, unless the context indicates otherwise. Moreover, the terms "comprises," "comprising," "includes," and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition. Moreover, unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

What is claimed is:

1. A ceiling mount for an electronic device, comprising:
   a mounting plate assembly configured to be coupled to the electronic device;

two clips configured to engage with opposite sides of a ceiling rail to mount the ceiling mount to the ceiling rail, wherein each of the clips comprises:

at least one engagement member configured to engage the ceiling rail; and at least one supporting arm coupled to the at least one engagement member; and two linkages configured to be extendible and collapsible;

wherein the mounting plate assembly is positioned between the two clips and the two linkages, and wherein each of the linkages is connected to each of the clips and to the mounting plate assembly so that motion of the linkages is constrained by the mounting plate assembly and motion of the clips relative to the mounting plate assembly is coordinated by the linkages and the mounting plate assembly.

2. The ceiling mount of claim 1, wherein the motion of the clips is coordinated by the linkages and the mounting plate assembly so that at least one of:

in response to motion of one of the clips relative to the mounting plate assembly, the linkages cause the other one of the clips to move in an opposite direction relative to the mounting plate assembly;

in response to one of the clips being held stationary relative to the mounting plate assembly, the linkages prevent motion of the other one of the clips relative to the mounting plate assembly;

during motion of the clips relative to the mounting plate assembly, the linkages cause the clips to remain parallel to each other;

during motion of the clips relative to the mounting plate assembly, the linkages cause the clips to remain equidistant from a centerline of the ceiling mount; or any combination of these.

3. The ceiling mount of claim 1, wherein the motion of the clips is coordinated by the linkages and the mounting plate assembly so that, in response to motion of one of the clips relative to the mounting plate assembly, the linkages cause the other one of the clips to move in an opposite direction relative to the mounting plate assembly and to remain parallel to each other and equidistant from a centerline of the ceiling mount.

4. The ceiling mount of claim 1, wherein each of the two linkages includes two links connected by a first pivot so that the two links rotate around the first pivot relative to each other.

5. The ceiling mount of claim 4, wherein the two links of each linkage move around the first pivot relative to each other such that a range of motion of the two links spans from an overlapping position, when each linkage is in a substantially collapsed position, to a position when the two links point in directions opposite from each other, when each linkage is in a substantially extended position.

6. The ceiling mount of claim 1, further comprising a plurality of elongated slots in the mounting plate assembly, wherein the linkages are connected to the clips by fasteners that extend through the slots.

7. The ceiling mount of claim 6, wherein the plurality of elongated slots include a first set of slots and a second set of slots, and wherein each slot of the first set of slots is elongated in a direction parallel to a first axis and each slot of the second set of slots is elongated in a direction that is parallel to a second axis perpendicular to the first axis.

8. The ceiling mount of claim 7, wherein the first set of slots constrain the fasteners to motion parallel to the first axis, wherein each of the two linkages includes two links connected by a pivot, such that the two links move around the pivot relative to each other, and wherein each of the pivots of the linkages is engaged with a corresponding slot of the second set of slots and constrained thereby to motion parallel to the second axis.

9. The ceiling mount of claim 8, wherein the plurality of elongated slots constrains the fasteners, and the pivots constrain a motion of the linkages and thereby coordinates a constrained movement of the two clips.

10. The ceiling mount of claim 9, wherein the constrained movement of the two clips results in a movement of a corresponding at least one engagement member of each of the two clips, the at least one engagement member of each of the two clips being configured to engage the ceiling rail.

11. The ceiling mount of claim 10, wherein the two linkages move relative to the mounting plate assembly such that the two clips remain parallel to each other thereby ensuring that the corresponding at least one engagement member of each of the two clips move parallel to each other.

12. The ceiling mount of claim 8, wherein each of the pivots of the two linkages is allowed to move in a restricted direction aligned with a symmetry axis of the mounting plate assembly, such that the two clips remain parallel to each other and centered around the symmetry axis of the mounting plate assembly.

13. A system comprising:

an electronic device; and a ceiling mount for mounting the electronic device to a ceiling rail, comprising:

a mounting plate assembly configured to be coupled to the electronic device;

two clips configured to engage with opposite sides of a ceiling rail to mount the ceiling mount to the ceiling rail, wherein each of the clips comprises:

at least one engagement member configured to engage the ceiling rail; and at least one supporting arm coupled to the at least one engagement member; and two linkages configured to be extendible and collapsible;

wherein the mounting plate assembly is positioned between the two clips and the two linkages, wherein each of the two linkages is connected to each of the two clips so that moving the two clips relative to the mounting plate assembly moves the two linkages relative to the mounting plate assembly, and wherein the two linkages move relative to the mounting plate assembly so that the two clips remain parallel to each other.

14. The system of claim 13, wherein each of the two linkages includes two links connected by a pivot so that the two links move around the pivot relative to each other.

15. The system of claim 14, wherein the two links move around the pivot relative to each other in a motion that resembles hands of a clock.

16. The system of claim 14, wherein the two links of each linkage move around the pivot relative to each other such that a range of motion of the two links spans from an overlapping position, when each linkage is in a fully collapsed position, to a position when the two links point in directions opposite from each other, when each linkage is in a fully extended position.

17. The system of claim 13, wherein each of the two linkages is connected to each of the two clips through apertures in the mounting plate assembly.

18. The system of claim 17, wherein the apertures in the mounting plate assembly are elongated slots.

19. The system of claim 18, wherein the elongated slots in the mounting plate assembly include a first set of slots and a second set of slots, and wherein the first set of slots is elongated in a direction that is perpendicular to an elongation direction of the second set of slots.

20. A method of mounting an electronic device to a ceiling rail by using a ceiling mount, the method comprising:

positioning the ceiling mount adjacent the ceiling rail, moving a first clip and a second clip of the ceiling mount onto flanges of the ceiling rail by moving the first clip towards the ceiling rail, wherein moving the first clip causes the second clip to also move towards the ceiling rail and motion of the first and second clip is coordinated by two linkages coupled to the clips and by a mounting plate coupled to the linkages and the clips, wherein the first clip and the second clip are configured to engage with opposite sides of the ceiling rail to mount the ceiling mount to the ceiling rail, wherein each of the clips comprises:

at least one engagement member configured to engage the ceiling rail; and at least one supporting arm coupled to the at least one engagement member; and wherein the two linkages are configured to be extendible and collapsible and each of the two linkages is connected to each of the two clips; and securing the first clip and the second clip on the ceiling rail by moving a locking pin coupled to one of the clips into engagement with a locking hole in the ceiling mount.

\* \* \* \* \*